(12) United States Patent
Hayashi et al.

(10) Patent No.: US 6,866,954 B2
(45) Date of Patent: Mar. 15, 2005

(54) FUEL CELL STACK AND A METHOD OF SUPPLYING REACTANT GASES TO THE FUEL CELL STACK

(75) Inventors: Katsumi Hayashi, Utsunomiya (JP);
Hideo Okamoto, Utsunomiya (JP);
Hideo Kato, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/232,086

(22) Filed: Aug. 29, 2002

(65) Prior Publication Data

US 2003/0044657 A1 Mar. 6, 2003

(30) Foreign Application Priority Data

Aug. 29, 2001 (JP) .......................................... 2001-260399

(51) Int. Cl.[7] ................................................ H01M 8/18
(52) U.S. Cl. ............................. 429/19; 429/12; 429/35
(58) Field of Search ............................... 429/12, 19, 35

(56) References Cited

U.S. PATENT DOCUMENTS 4,310,605 A * 1/1982 Early et al. .................... 429/18

FOREIGN PATENT DOCUMENTS

| JP | 8-130028 | 5/1996 |
| JP | 8-167424 | 6/1996 |

* cited by examiner

*Primary Examiner*—Dah-Wei Yuan
(74) *Attorney, Agent, or Firm*—Anthony A. Laurentano; Lahive & Cockfield, LLP

(57) ABSTRACT

A fuel cell stack includes a plurality of unit cells stacked together. End cell stacks are disposed at opposite ends of the unit cells in the stacking direction. The unit cells between the end cell stacks are electrically connected in series. A first unit cell and a second unit cell in each of the end cell stacks are electrically connected in parallel by a cable. In each of the first and second unit cells a membrane electrode assembly is interposed between a first separator, and a second separator.

5 Claims, 8 Drawing Sheets

FUEL CELL STACK AND A METHOD OF SUPPLYING REACTANT GASES TO THE FUEL CELL STACK

BACKGROUND OF THE INVENTION

1. Field of the Invention

The present invention relates to a fuel cell stack and a method of supplying reactant gases to the fuel cell stack. The fuel cell stack comprises units of fuel cells stacked together. Each of the fuel cells includes a pair of separators and a membrane electrode assembly interposed between the separators. The membrane electrode assembly includes an anode, a cathode, and an ion exchange membrane of solid polymer electrolyte interposed between the anode and the cathode.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon. The membrane electrode assembly is interposed between separators (bipolar plates). The membrane electrode assembly and the separators make up a unit of the fuel cell for generating electricity. A plurality of fuel cells are connected together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

In the fuel cell stack, temperature of some of the fuel cells tends to be low in comparison with the other fuel cells. Specifically, one end surface of each of the outermost fuel cells (end cells) in the stacking direction is exposed to the external air, and thus, the fuel cells are likely to be cooled by the external air. Further, when a manifold is disposed between two of fuel cells stacked together, the fuel cells adjacent to the manifold are likely to be cooled by the manifold. If the temperature of the fuel cells is lowered significantly, the power generating performance of the fuel cells is lowered. Further, condensation of water may occur in the fuel cells. Water produced in the chemical reactions is not smoothly discharged from the fuel cells, and the voltage of the fuel cells is lowered.

In particular, when the fuel cell stack is operated at a temperature below the freezing point, the difference between the temperature in the fuel cell stack and the external air temperature is large. Therefore, the temperature in each of the end cells is lowered significantly. If the operation the fuel cell stack is started at the temperature below the freezing point, water produced at the time of power generation in each of the end cells is cooled below the freezing point. The frozen water may close reactant gas flow passages (oxygen-containing gas flow passage and/or fuel gas flow passage) or the porous carbon undesirably. As a result, a shortage of reactant gases may occur in the end cells. The shortage of the reactant gases gives rise to a voltage drop in the end cells.

In an attempt to prevent the end cells from being cooled excessively, for example, Japanese laid-open patent publication No. 8-130028 (the prior art 1) discloses a solid polymer electrolyte fuel cell stack which does not have any grooves (coolant passages) in outer separators of end cells for preventing the separators from being cooled excessively and preventing condensation of water.

Further, Japanese laid-open patent publication No. 8-167424 (prior art 2) discloses a solid polymer electrolyte fuel cell stack which includes heating members heated by an electric current flowing from the solid polymer electrolyte fuel cell stack. The heating member is disposed at least on each of current collectors in contact with the outer surfaces of outermost separators of the fuel cell stack for preventing end cells from being cooled excessively and preventing condensation of water.

In the prior arts 1 and 2, in order to prevent the end cells from being cooled excessively, the separator which does not have any grooves (coolant passages) or the heater heated by the electric current flowing from the solid polymer electrolyte fuel cell stack is used. Therefore, the special designs at opposite ends of the fuel cell stack make it difficult to downsize the fuel cell stack.

Further, in the prior art 1, the solid polymer electrolyte fuel cell stack requires different types of separators, i.e., the separator which has the groove as the coolant passage, and the separator which does not have the groove. The requirement for the different types of separators is a burden in the production line, and thus, the production cost is high.

SUMMARY OF THE INVENTION

A general object of the present invention is to provide a fuel cell stack in which water produced in chemical reactions does not condense, and thus, the power generating performance of the overall fuel cell stack is improved effectively.

A principle object of the present invention is to provide a method of supplying reactant gases to each of unit cells for smoothly discharging water from the fuel cell stack for efficiently generating electricity in the fuel cell stack.

In the present invention, a fuel cell stack comprises a plurality of unit cells stacked together, the unit cells each including a pair of separators, and a membrane electrode assembly interposed between the separators, the membrane electrode assembly including an anode, a cathode, and an ion exchange membrane of solid polymer electrolyte interposed between the anode and the cathode, wherein at least two adjacent unit cells are electrically connected in parallel.

When n unit cells (n=number of unit cells) are connected in parallel (parallel unit cells), the electric current flowing through each of the unit cells is 1/n of the electric current flowing through the other unit cells which are electrically connected in series (serial unit cells).

Therefore, if cross sectional areas of the reactant gas passages is the same in each of the parallel unit cells and the serial unit cells, the current density per unit area on the electrodes of the parallel unit cells is 1/n of the current density of the serial unit cells. Thus, in comparison with the serial unit cells, the amount of unreacted gases which are not reacted in the chemical reactions is large in the parallel unit cells.

The unreacted gases vaporize the water and/or remove the condensed water. Thus, the water is efficiently discharged from the fuel cell stack. Further, the vapor produced by the chemical reactions for generating electricity in the parallel unit cells is only 1/n of the vapor produced in the other serial unit cells. Therefore, the vapor does not condense in the parallel unit cells significantly.

The oxygen-containing gas flow passage, the fuel gas flow passage, and/or the porous gas diffusion layer are prevented from being closed by the water produced in the chemical reactions. Therefore, the power generating performance of the fuel cell stack is effectively enhanced.

In a method of supplying reactant gases to a fuel cell stack of the present invention, the fuel cell stack comprises a plurality of unit cells stacked together. Each of the unit cells includes a pair of separators, and a membrane electrode assembly interposed between said separators. The membrane electrode assembly includes an anode, a cathode, and an ion exchange membrane of solid polymer electrolyte interposed between the anode and the cathode. At least two adjacent unit cells are electrically connected in parallel. The same amount of reactant gases are supplied to each of the unit cells including unit cells electrically connected in series, and at least two unit cells electrically connected in parallel.

Therefore, it is possible to supply the reactant gases to the unit cells of the end cell stack in the amount sufficient to discharge the water produced in the chemical reactions from the end cell stack without controlling the amount of reactant gases. The water is smoothly discharged from the end cell stack, and thus, the power generating performance of the overall fuel cell stack is effectively maintained at a desired level.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
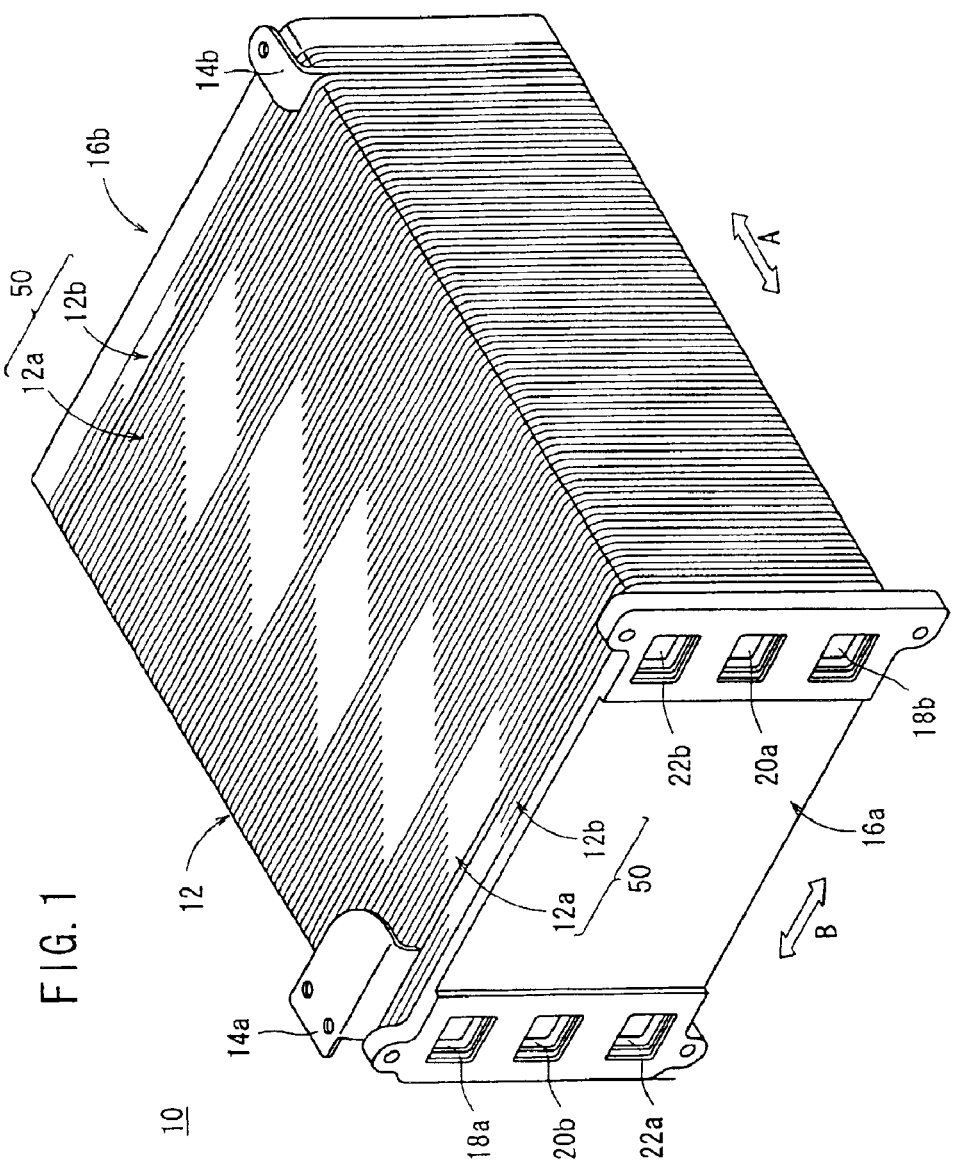
FIG. 1 is a schematic perspective view showing a fuel cell stack according to a first embodiment of the present invention.
Figure 2:
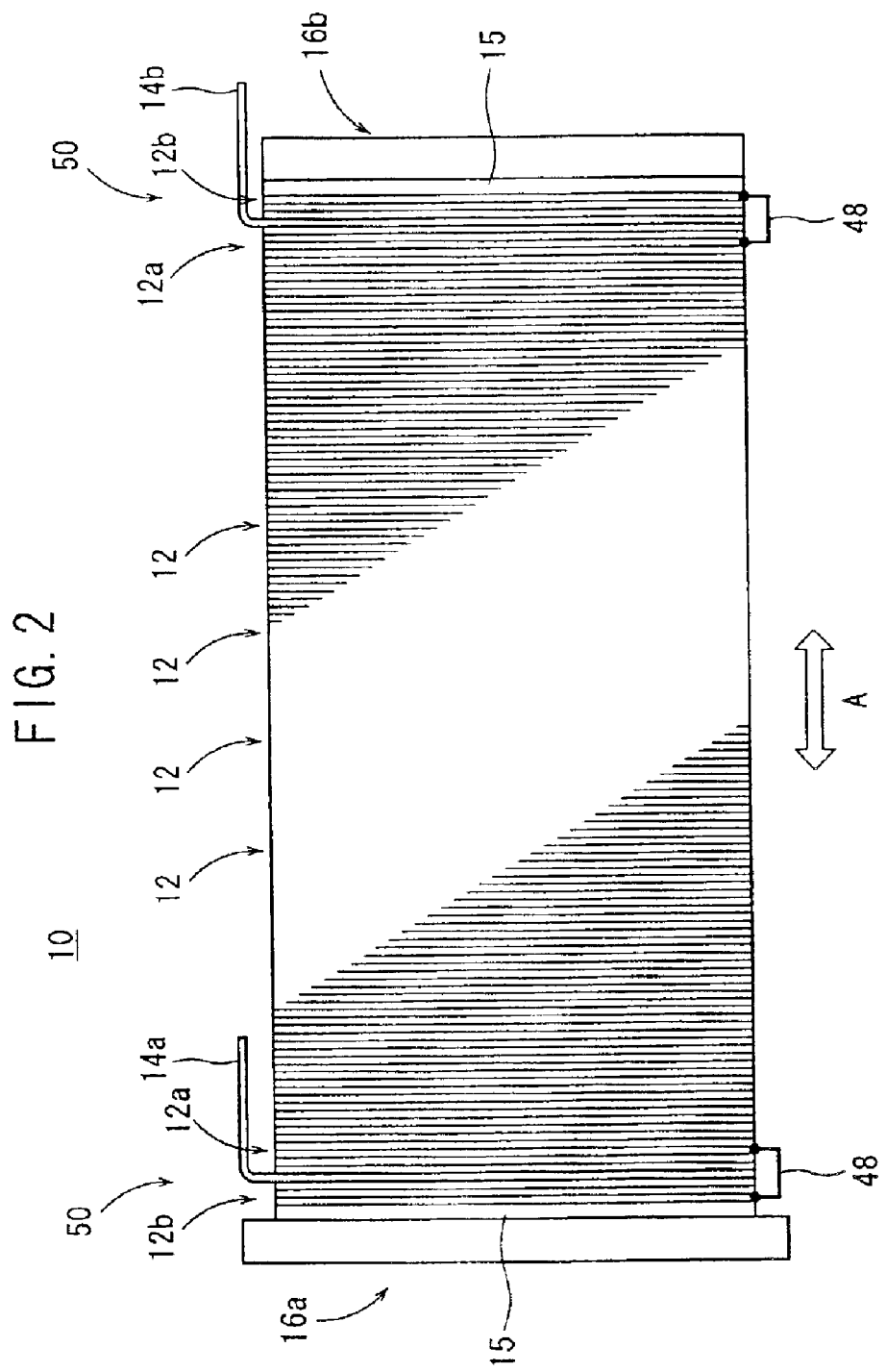
FIG. 2 is a side view showing the fuel cell stack.
Figure 3:
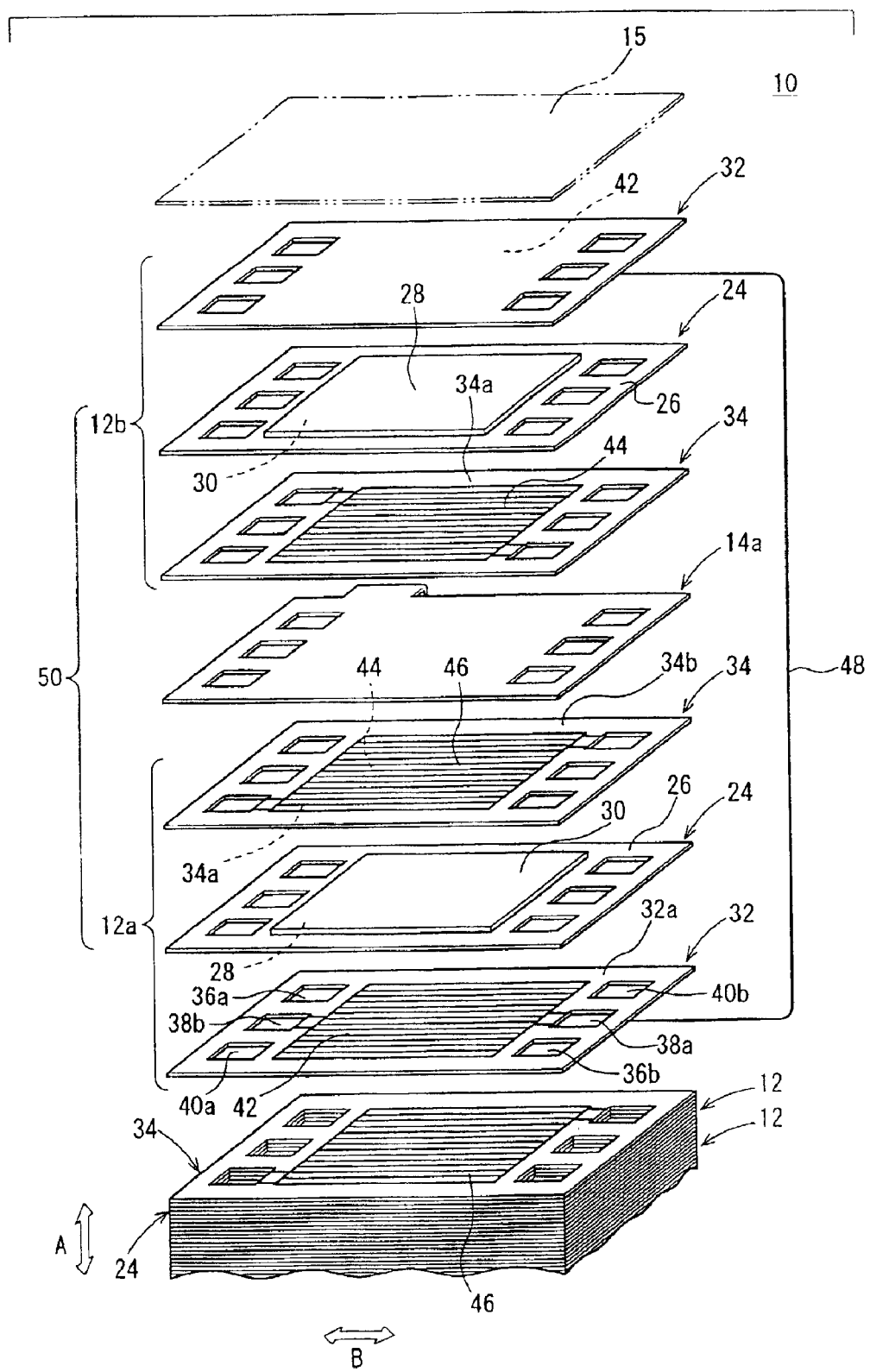
FIG. 3 is an exploded perspective view showing main components of the fuel cell stack.

FIG. 1 is a schematic perspective view showing a fuel cell stack 10 according to a first embodiment of the present invention. FIG. 2 is a side view showing the fuel cell stack 10, and FIG. 3 is an exploded perspective view showing main components of the fuel cell stack 10.

The fuel cell stack 10 includes units of fuel cells (unit cells) 12 stacked in a direction indicated by an arrow A. First units of fuel cells (first unit cells) 12a are disposed at opposite ends in the stacking direction of the unit cells 12. A cathode current terminal (positive electrode) 14a and an anode current terminal (negative electrode) 14b are stacked on the outside of the first unit cells 12a, respectively. Second units of fuel cells (second unit cells) 12b are stacked on the outside of the cathode terminal 14a and the anode terminal 14b, respectively. Insulating plates 15 are stacked on the outside of the second unit cells 12b, respectively. Further, end plates 16a, 16b are stacked on the outside of the insulating plates 15, respectively. The unit cells 12 are fastened together to form the fuel cell stack 10 by tightening the end plates 16a, 16b with an unillustrated tie rod or the like.

As shown in FIG. 1, at one longitudinal end of the end plate 16a in a direction indicated by an arrow B, an oxygen-containing gas supply port 18a, a fuel gas discharge port 20b, and a coolant supply port 22a are arranged vertically. At the other longitudinal end of the end plate 16a, a coolant discharge port 22b, a fuel gas supply port 20a, and an oxygen-containing gas discharge port 18b are arranged vertically.

The first unit cell 12a and the second unit cell 12b are electrically connected in parallel. The other unit cells 12 between the first unit cells 12a are electrically connected in series.

As shown in FIG. 3, the first unit cell 12a includes a membrane electrode assembly 24. The membrane electrode assembly 24 comprises an anode 28, and a cathode 30, and a solid polymer ion exchange membrane 26 interposed between the anode 28 and the cathode 30. Each of the anode 28 and the cathode 30 comprises a sheet of porous carbon paper acting as a gas diffusion layer, and a noble metal based catalyst coated on the gas diffusion layer. The membrane electrode assembly 24 is interposed between conductive separators, i.e., a first separator 32, and a second separator 34. The membrane electrode assembly 24 and the first separator 32, and the second separator 34 jointly make up the first unit cell 12a. At one longitudinal end of the first unit cell 12a in the direction indicated by an arrow B, an oxygen-containing gas supply passage 36a, a fuel gas discharge passage 38b, and a coolant supply passage 40a are arranged. At the other longitudinal end of the first unit cell 12a, a coolant discharge passage 40b, a fuel gas supply passage 38a, and an oxygen-containing gas discharge passage 36b are arranged.

The first separator 32 has a fuel gas flow passage 42 comprising a plurality of grooves on its surface 32a facing to the anode 28. The fuel gas flow passage 42 is connected to the fuel gas supply passage 38a at one side and connected to the fuel gas discharge passage 38b at the other side.

As with the first separator 32, the second separator 34 has an oxygen-containing gas flow passage 44 comprising a plurality of grooves on its surface 34a facing to the cathode 30. The oxygen-containing gas flow passage 44 is connected to the oxygen-containing gas supply passage 36a at one side and connected to the oxygen-containing gas discharge passage 36b at the other side. A coolant flow passage 46 connected to the coolant supply passage 40a and the coolant discharge passage 40b is formed on a surface 34b of the second separator 34.

The first unit cells 12a and the other unit cells 12 interposed between the first unit cells 12a have the same structure. The constituent elements of the unit cells 12 that are identical to those of the first unit cells 12a are labeled with the same reference numeral, and description thereof is omitted.

The components of the second unit cell 12b and the components of the first unit cell 12a are arranged symmetrically about the cathode terminal 14a. The second separator 34 of the second unit cell 12b is disposed adjacent to the cathode terminal 14a. The first separator 32 is disposed outside the second separator 34 such that the membrane electrode assembly 24 is interposed between the first separator 32 and the second separator 34.

The end plate 16a is attached to the fuel cell stack 10 such that the insulating plate 15 is interposed between the end plate 16a and the first separator 32 of the second unit cell 12b.

The first separator 32 of the first unit cell 12a and the first separator 32 of the second unit cell 12b are connected by a cable 48 for electrically connecting the first unit cell 12a and the second unit cell 12b in parallel to form an end cell stack 50.

In the first and second unit cells 12a, 12b, it is preferable to reduce the power generating efficiency. Therefore, the amount of catalyst in the solid polymer ion exchange membranes 26 of the membrane electrode assemblies 24 in the first and second unit cells 12a, 12b may be small in comparison with the other unit cells 12, to increase the activation overpotential or resistance overpotential of the first and second unit cells 12a, 12b, for example. The structure of the anode terminal (negative electrode) 14b is same with the structure of the cathode terminal (positive electrode) 14a. Therefore, detailed description of the anode terminal 14b is omitted.

An operation of the fuel cell stack 10 according to the first embodiment of the present invention and a method of supplying reactant gases to the fuel cell stack 10 according to the present invention will be described below.

In the fuel cell stack 10 shown in FIG. 1, a fuel gas such as a hydrogen-containing gas is supplied to the fuel gas supply port 20a, an oxygen-containing gas such as air is supplied to the oxygen-containing gas supply port 18a, a coolant such as a pure water, an ethylene glycol or an oil is supplied to the coolant supply port 22a. From the fuel gas supply port 20a, the oxygen-containing gas supply port 18a, and the coolant supply port 22a, the fuel gas, the oxygen-containing gas, and the coolant are supplied to each of the unit cells 12 including the first and second unit cells 12a, 12b which are stacked together in the direction indicated by the arrow A to form the fuel cell stack 10.

Figure 4:
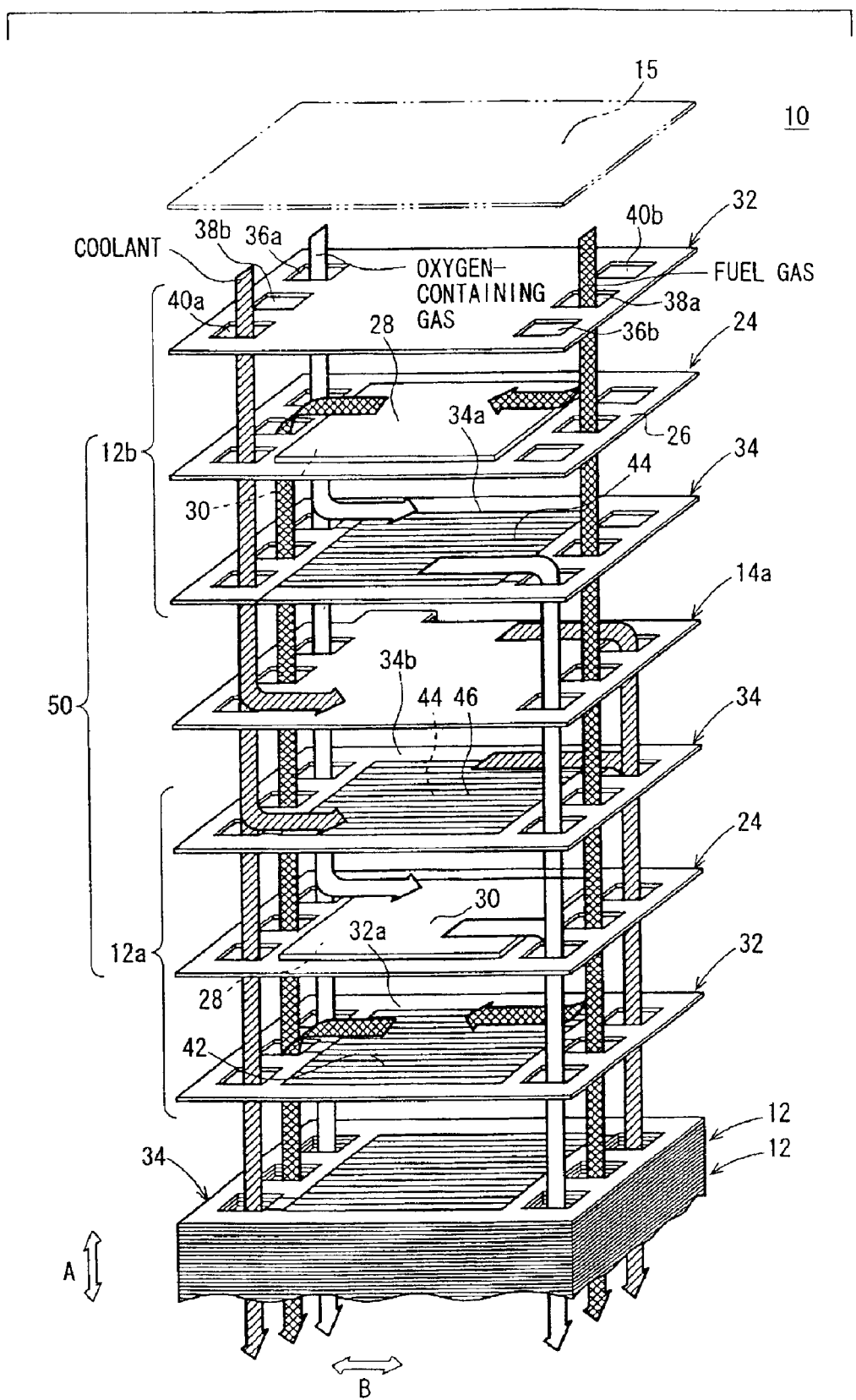
FIG. 4 is a view showing flows of fluids flowing in an end cell stack of the fuel cell stack.

As shown in FIG. 4, the oxygen-containing gas supplied to the oxygen-containing gas supply port 18a flows through the oxygen-containing gas supply passage 36a in the direction indicated by the arrow A. The oxygen-containing gas is introduced into the oxygen-containing gas flow passage 44 formed on the surface 34a of the second separator 34. The oxygen-containing gas in the oxygen-containing gas flow passage 44 flows along the cathode 30 to induce a chemical reaction at the cathode 30. The unreacted oxygen-containing gas is discharged from the fuel cell stack 10 through the oxygen-containing gas discharge passage 36b.

The fuel gas supplied to the fuel gas supply port 20a is introduced into the fuel gas supply passage 38a extending in the direction indicated by the arrow A. Then, the fuel gas is introduced into the fuel gas flow passage 42 formed on the surface 32a of the first separator 32. The fuel gas in the fuel gas flow passage 42 flows along the anode 28 to induce a chemical reaction at the anode 28. The unreacted fuel gas is discharged from the fuel cell stack 10 through the fuel gas discharge passage 38b. In the membrane electrode assembly 24, the oxygen-containing gas supplied to the cathode 30, and the fuel gas supplied to the anode 28 are consumed in the electrochemical reactions at catalyst layers of the cathode 30 and the anode 28 for generating electricity.

The coolant supplied to the coolant supply port 22a is introduced into the coolant flow passage 46 on the surface 34b of the second separator 34 through the coolant supply passage 40a. After absorbing the heat produced in generating electricity in the membrane electrode assembly 24, the coolant is discharged from the coolant discharge port 22b through the coolant discharge passage 40b.

In the fuel cell stack 10, water vapor is produced by the chemical reactions for generating electricity. The temperature of the opposite ends in the stacking direction of the fuel cell stack 10 tend to be cooled by the external air. Therefore, the water vapor may be condensed into liquid water.

In the fuel cell stack 10 of the first embodiment, the end cell stack 50, which is likely to be cooled by the external air, is formed by the first unit cell 12a and the second unit cell 12b. The first unit cell 12a and the second unit cell 12b are electrically connected in parallel by the cable 48.

Figure 5:
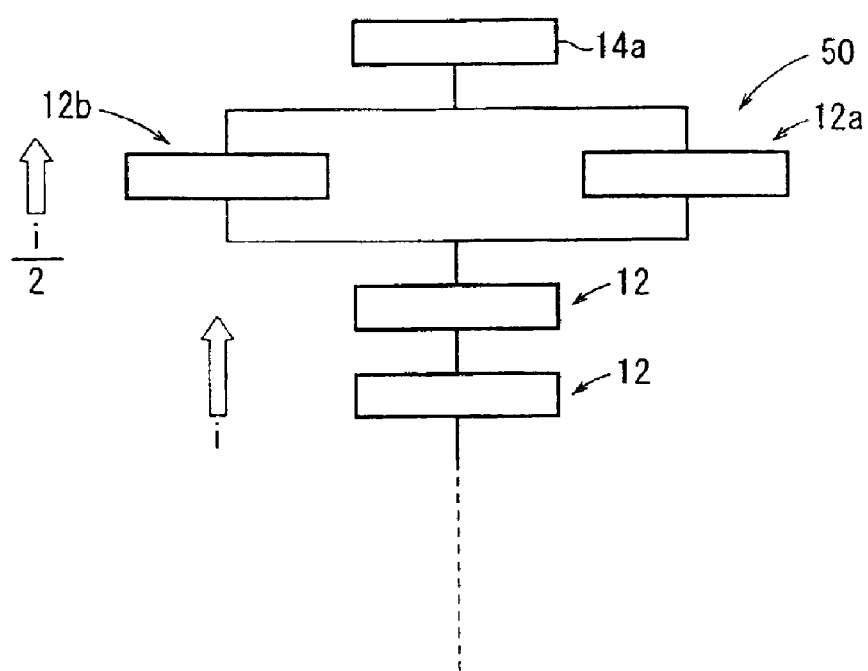
FIG. 5 is a view showing electrical connection in the end cell stack.

Thus, as shown in FIG. 5, the unit cells 12 are electrically connected in series, and the first and second unit cells 12a, 12b are electrically connected in parallel. Since the amount of reactant gases (fuel gas and oxygen-containing gas) supplied to each of the first unit cell 12a, the second unit cell 12b, and the other unit cells 12 is the same, the electric current flowing through each of the first and the second unit cells 12a, 12b is ½ of the electric current flowing through the unit cells 12. Stated otherwise, the current density (i/2) per unit area on the electrodes of the first and second unit cells 12a, 12b is ½ of the current density (i) of the unit cells 12.

Therefore, in comparison with the unit cells 12, in the first and second unit cells 12a, 12b, the amount of unreacted gases which are not reacted in the chemical reactions is large. The unreacted gases vaporize the water and/or remove the condensed water in the first and second unit cells 12a, 12b. Thus, the water is efficiently discharged from the fuel cell stack 10. Further, the vapor produced by the chemical reactions for generating electricity in each of the first and second unit cells 12a, 12b is only ½ of the vapor produced in the other unit cells 12. Therefore, the vapor does not condense in the first and second unit cells 12, 12b significantly.

The oxygen-containing gas flow passage 44, the fuel gas flow passage 42, and/or the porous gas diffusion layer are prevented from being closed by the water produced in the chemical reactions. Therefore, the power generating performance of the fuel cell stack 10 is effectively enhanced.

In particular, the fuel cell stack 10 according to the first embodiment is suitably operated even if the fuel cell stack 10 is operated in an atmosphere at a temperature below the freezing point. If the temperature of the external air is below the freezing point, the difference between the temperature in the fuel cell stack 10 and the external air temperature is large. Therefore, the temperature in each of the end cell stacks 50 is lowered significantly. If the operation the fuel cell stack 10 is started at the temperature below the freezing point, water produced at the time of power generation in each of the end cell stacks 50 is cooled below the freezing point. The frozen water may close oxygen-containing gas flow passage 44 and/or fuel gas flow passage 42 undesirably.

Therefore, the end cell stack 50 is formed by the first unit cell 12a and the second unit cell 12b which are electrically connected in parallel for smoothly discharging the water from the end cell stack 50 and efficiently preventing the water from being frozen in the end cell stack 50.

Further, in the first embodiment, the amount of fuel gas and oxygen-containing gas supplied to each of the first unit cell 12a, the second unit cell 12b, and the other unit cells 12 is the same. Therefore, it is possible to supply the reactant gases to the end cell stack 50 in the amount sufficient to discharge the water produced in the chemical reactions from the end cell stack 50 without controlling the amount of reactant gases supplied to each of the first unit cell 12a, the second unit cell 12b, and the other unit cells 12. The water is smoothly discharged from the end cell stack 50, and thus, the power generating performance of the overall fuel cell stack 10 is effectively maintained at a desired level.

Further, in the first embodiment, the activation overpotential or resistance overpotential of the membrane electrode assemblies 24 of the first and second unit cells 12a, 12b is large in comparison with the membrane electrode assemblies 24 of the other unit cells 12. Therefore, the temperature of the end cell stack 50 is increased by self-heating.

Figure 6:
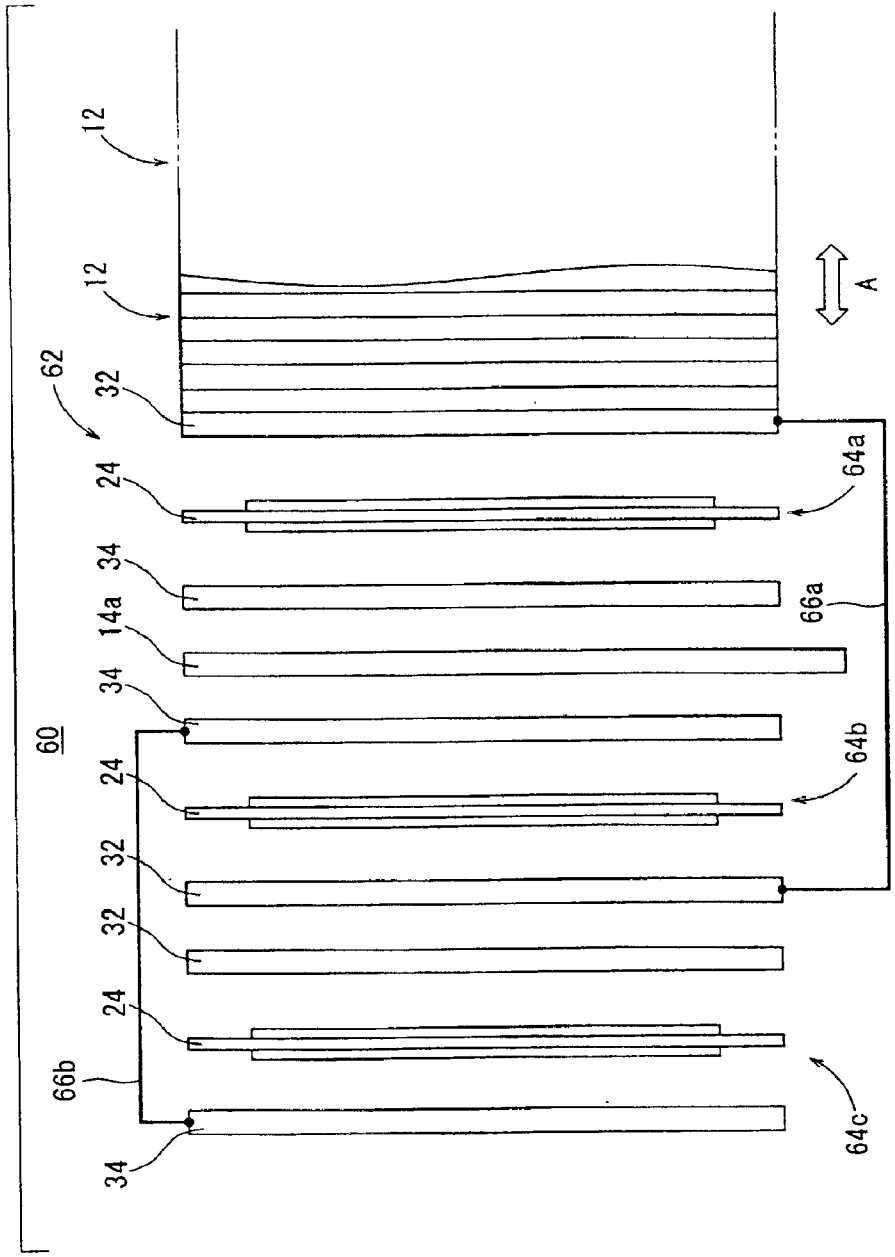
FIG. 6 is an exploded view showing main components of a fuel cell stack according to a second embodiment of the present invention.

FIG. 6 is a view showing main components of a fuel cell stack 60 according to a second embodiment of the present invention. The constituent elements that are identical to those of the fuel cell stack 10 according to the first embodiment are labeled with the same reference numeral, and description thereof is omitted. Further, in a third embodiment as described later on, the constituent elements that are identical to those of the fuel cell stack 10 according to the first embodiment are labeled with the same reference numeral, and description thereof is omitted.

The fuel cell stack 60 comprises a plurality of unit cells 12 stacked in a direction indicated by an arrow A, and end cell stacks 62 disposed at opposite ends of the unit cells 12. Each of the end cell stacks 62 comprises a first unit cell 64a, a second unit cell 64b, and a third unit cell 64c.

A cathode terminal (positive electrode) 14a is disposed between the first unit cell 64a and the second unit cell 64b. The first unit cell 64a, the third unit cell 64c, and the unit cell 12 have the same structure. The second unit cell 64b and the unit cell 12 are arranged symmetrically. The relationship between the first unit cell 64a and the second unit cell 64b are same as the relationship between the first unit cell 12a and the second unit cell 12b of the fuel cell stack 10.

Figure 7:
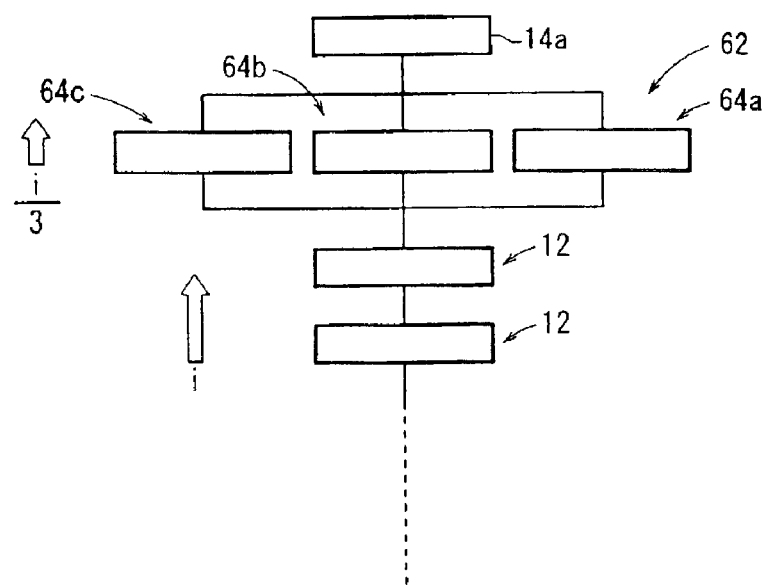
FIG. 7 is a view showing electrical connection in an end cell stack of the fuel cell stack according to the second embodiment of the present invention.

First separators 32 of the first unit cell 64a and the second unit cell 64b are electrically connected by a first cable 66a. Second separators 34 of the second unit cell 64b and the third unit cell 64c are electrically connected by a second cable 66b. Thus, as shown in FIG. 7, the unit cells 12 are electrically connected in series, and the first through third unit cells 64a, 64b, 64c are electrically connected in parallel to form the end cell stack 62.

In the second embodiment, when reactant gases are supplied into the fuel cell stack 60 for power generation, the electric current flowing through each of the first through third unit cells 64a, 64b, 64c is ⅓ of the electric current flowing through the other unit cells 12. Therefore, if cross sectional areas of the reactant gas passages (oxygen containing gas flow passage 44 and the fuel gas flow passage 42) in each of the first through third unit cells 64a, 64b, 64c, and the other unit cells 12 are the same, and the amount of reactant gases supplied to each of the first through third unit cells 64a, 64b, 64c, and the other unit cells 12 is the same, the current density (i/3) per unit area on the electrodes of the first through third unit cells 64a, 64b, 64c is ⅓ of the current density (i) of the unit cells 12.

Therefore, in the first through third unit cells 64a, 64b, 64c, the amount of unreacted gases which are not reacted in the chemical reactions is three times as large as that in the unit cells 12. The unreacted gases vaporize the water and/or remove the condensed water in the first through third unit cells 64a, 64b, 64c. Thus, the water is efficiently discharged from the fuel cell stack 60. Further, the vapor produced by the chemical reactions for generating electricity in each of the first through third unit cells 64a, 64b, 64c is only ⅓ of the vapor produced in the other unit cells 12. Therefore, the vapor does not condense in the first through third unit cells 64a, 64b, 64c significantly.

In the second embodiment, the water produced in chemical reactions is efficiently discharged from the end cell stack 62. In particular, even if the fuel cell stack 60 is operated in an atmosphere at a temperature below the freezing point, water is reliably prevented from being frozen, and the power generating performance is effectively maintained at a desired level.

In the second embodiment, an odd number of unit cells, i.e., the first through third unit cells 64a, 64b, 64c are electrically connected in parallel to form the end cell stack 62. Therefore, the end cell stack 62 has a positive electrode and a negative electrode at opposite ends. The cathode terminal 14a may be disposed between the first unit cell 64a and the second unit cell 64b. Alternatively, the cathode corrector may be disposed outside the second separator 34 of the third unit cell 64c. Other odd numbers (five, seven, . . . ) of unit cells may be electrically connected in parallel in the arrangement as described above.

Figure 8:
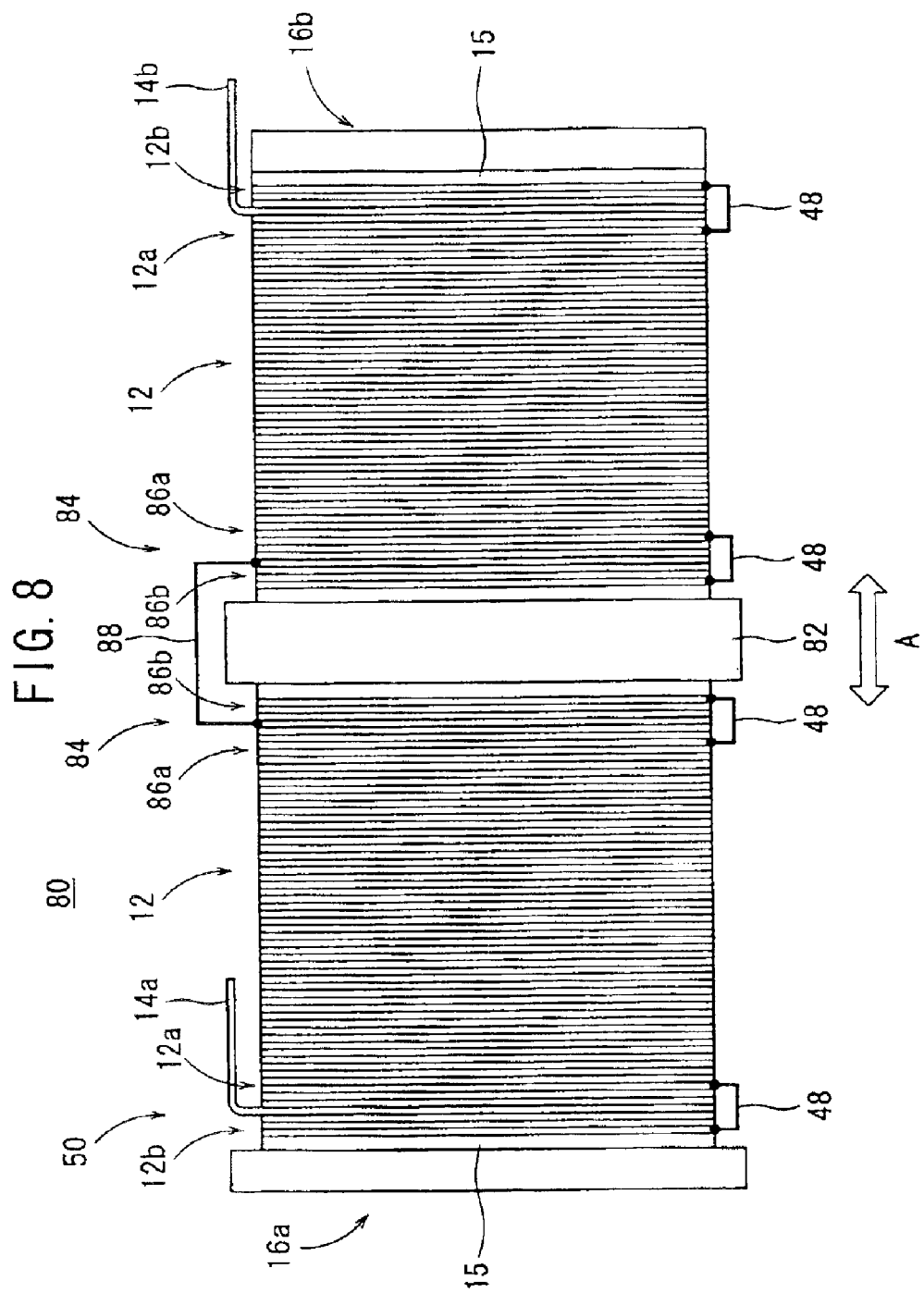
FIG. 8 is a view schematically showing a fuel cell stack according to a third embodiment of the present invention.

FIG. 8 is a view schematically showing a fuel cell stack 80 according to a third embodiment of the present invention.

The fuel cell stack 80 includes a central manifold 82 disposed between two of unit cells 12 stacked in a direction indicated by an arrow A. The central manifold 82 supplies reactant gases (oxygen containing gas and fuel gas) outwardly to the unit cells 12.

End cell stacks 84 are disposed on both sides of the central manifold 82. Further, end cell stacks 50 are disposed at opposite ends in the stacking direction of the fuel cell stack 80. Each of the end cell stacks 84 includes a first unit cell 86a which has the same structure as the unit cell 12 and stacked on the unit cell 12, and a second unit cell 86b which is symmetrical to the unit cell 12 and interposed between the first unit cell 86a and the central manifold 82. The first and second unit cells 86a, 86b of the end cell stack 84, and the first and second unit cells 12a, 12b of the end cell stack 50 have the same structure. The end cell stacks 84 are connected by a cable 88.

As described above, in the third embodiment, the central manifold 82 is disposed between two of unit cells 12 which are stacked to form the fuel cell stack 80. The end cell stacks 84 adjacent to the central manifold 82 are likely to be cooled by the central manifold 82. Therefore, in each of the end cell stacks 84, the first unit cell 86a and the second unit cell 86b are electrically connected in parallel as with the first unit cell 12a and the second unit cell 12b of the end cell stack 50.

Therefore, the water in the end cell stacks 84 does not condense significantly. The water in the end cell stacks 84 is vaporized or removed easily. Therefore, as with the first and second embodiments, the water is discharged from the end cell stacks 84 efficiently.

In the first and third embodiments, the end cell stack 50 is made up of two unit cells, i.e., the first and second unit cells 12a, 12b, and the end cell stack 84 is also made up of two unit cells, i.e., the first and second unit cells 86a, 86b. In the second embodiment, the end cell stack 62 is made up of three unit cells, i.e., the first through third unit cells 64a, 64b, 64c. However, the number of unit cells is not limited to two or three. Four or more unit cells may form an end cell stack.

In the fuel cell stack of the present invention, an end cell stack is made up of at least two unit cells (the number of unit cells=n) which are electrically connected in parallel. Therefore, in the end cell stack, the electric current flowing through each of the unit cells is 1/n of the electric current flowing through the other unit cells which are electrically connected in series. The current density per unit area on the electrodes of the unit cells of the end cell stack is 1/n of the current density of the other unit cells. Therefore, the amount of unreacted gases which are not reacted in the chemical reactions is large, and the unreacted gases vaporize the water and/or remove the condensed water. Thus, the water is efficiently discharged from the fuel cell stack. Further, in the end cell stack, the amount of vapor produced by the chemical reactions for generating electricity in each of the unit cells is small. Therefore, the vapor does not condense in the end cell significantly.

Further, it is possible to supply reactant gases to unit cells of the end cell stack in the amount sufficient to discharge the water produced in the chemical reactions from the end cell stack without controlling the amount of the reactant gases. The water is smoothly discharged from the end cell stack, and thus, the power generating performance of the overall fuel cell stack is effectively maintained at a desired level.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack, comprising:
   a plurality of unit cells stacked together, said unit cells each including a pair of separators,
   a membrane electrode assembly interposed between said separators, said membrane electrode assembly including
   an anode,
   a cathode, and
   an ion exchange membrane of solid polymer electrolyte interposed between said anode and said cathode,
   at least two adjacent unit cells electrically connected in parallel,
   one or more unit cells electrically coupled in series to said at least two adjacent unit cells, and
   a current terminal coupled to said at least two adjacent unit cells.

2. A fuel cell stack according to claim 1, comprising an end cell stack disposed at an end in a stacking direction of said unit cells,
   wherein said end cell stack includes a first unit cell and a second unit cell adjacently and symmetrically arranged with each other, and a separator of said first unit cell and a separator of said second unit cell having a same polarity are electrically connected by a cable.

3. A fuel cell stack according to claim 2, wherein membrane electrode assemblies of said first unit cell and said second unit cell have high activation overpotential or resistance overpotential in comparison with membrane electrode assemblies of the other unit cells.

4. A fuel cell stack according to claim 2, wherein a manifold is disposed between two of said unit cells stacked together, and said end cell stack is disposed on both sides of said manifold.

5. A method of supplying reactant gases to a fuel cell stack comprising a plurality of unit cells stacked together, said unit cells each including a pair of separators, and a membrane electrode assembly interposed between said separators, said membrane electrode assembly including an anode, a cathode, and an ion exchange membrane of solid polymer electrolyte interposed between said anode and said cathode, said method comprising the steps of:
   supplying the same amount of reactant gases to each of said unit cells including unit cells electrically connected in series, electrically connecting at least two unit cells in parallel, electrically connecting one or more unit cells in series to said at least two adjacent unit cells, and connecting a current terminal to said at least two adjacent unit cells.

* * * * *